(12) United States Patent
Knight et al.

(10) Patent No.: US 8,719,436 B2
(45) Date of Patent: May 6, 2014

(54) TUNNELING NON-HTTP TRAFFIC THROUGH A REVERSE PROXY

(75) Inventors: Keith Bryan Knight, Lexington, KY (US); James Winston Lawwill, Jr., Winchester, KY (US); Brian L. Pulito, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 10/679,654

(22) Filed: Oct. 6, 2003

(65) Prior Publication Data

US 2005/0076126 A1 Apr. 7, 2005

(51) Int. Cl.
*G06F 15/16* (2006.01)

(52) U.S. Cl.
USPC .......................................... 709/231; 709/227

(58) Field of Classification Search
None
See application file for complete search history.

(56) References Cited

U.S. PATENT DOCUMENTS

| | | | | |
|---|---|---|---|---|
| 5,825,890 | A | * | 10/1998 | Elgamal et al. ............... 713/151 |
| 6,081,900 | A | * | 6/2000 | Subramaniam et al. ...... 713/201 |
| 6,104,716 | A | * | 8/2000 | Crichton et al. ............... 370/401 |
| 6,167,450 | A | * | 12/2000 | Angwin et al. ................ 709/227 |
| 6,349,336 | B1 | * | 2/2002 | Sit et al. ......................... 709/227 |
| 6,622,184 | B1 | * | 9/2003 | Tabe et al. ......................... 710/36 |
| 6,704,873 | B1 | * | 3/2004 | Underwood ................... 713/201 |
| 6,754,831 | B2 | * | 6/2004 | Brownell .......................... 726/15 |
| 6,765,881 | B1 | * | 7/2004 | Rajakarunanayake ........ 370/256 |

OTHER PUBLICATIONS

Cheong, Pua Yeow; Java Tip 111: *Implement HTTPS tunneling with JSSE*; JavaWorld.com; 2003; JavaWorld.com, an IDG Company.
Author unknown; Using a Domino passthru server as a proxy; Network Configuration.
Author unknown; *Connecting through proxy servers*; Ch. 14 Using SSL and Proxy Connections in Java Clients; 2000; Sybase, Inc.

* cited by examiner

*Primary Examiner* — John B. Walsh
(74) *Attorney, Agent, or Firm* — Steven M. Greenberg, Esq.; CRGO Law

(57) ABSTRACT

A method, system and apparatus for tunneling non-hypertext transfer protocol (HTTP) data streams through a reverse proxy. The method can include soliciting a connection with a reverse proxy protecting a back-end server computing device. A connection can be established with the back-end server computing device via the reverse proxy through the solicitation. Responsive to establishing the connection, the connection can be maintained in order to exchange non-HTTP data over the secured connection. Significantly, and unlike prior art HTTP tunneling implementations, in the present invention, the non-HTTP data can be exchanged over the connection without encapsulating the non-HTTP data within HTTP messages.

13 Claims, 3 Drawing Sheets

TUNNELING NON-HTTP TRAFFIC THROUGH A REVERSE PROXY

BACKGROUND OF THE INVENTION

1. Statement of the Technical Field

The present invention relates to the field of network connectivity and multimedia protocols and more particularly to managing connectivity through a reverse proxy.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. Nevertheless, the real-time delivery requirements of audio and video have strained the infrastructure of the Internet in its ability to support multimedia collaboration.

Along with the dramatic rise in Internet usage over the past decade, a correspondingly dramatic increase in hacking and unauthorized accessing of data over the Internet has been observed. In response, contemporary network architecture theory incorporates network elements tasked with the security of discrete portions of the Internet. Typical network elements include firewalls, SOCKS proxies, hypertext transfer protocol (HTTP) proxies, network obfuscation units such as network and port address translation, and the like. The use of these network elements, however, can complicate the accommodation of collaborative computing technologies. In particular, the disposition of a security device in the path of real-time data transmissions can interrupt if not completely block the flow of the real-time data from source to sink.

One type of network security element, the reverse proxy, can be used to protect a cluster of servers from discretionary access by clients residing in the Internet. The reverse proxy can protect the cluster of servers by forcing external clients to connect to individual servers within the cluster only through the reverse proxy. The reverse proxy itself can manage authentication, address translation and monitoring of data flowing through the reverse proxy in order to ensure protocol integrity. In this regard, the reverse proxy only can support the HTTP protocol.

It can be quite complicated to exchange audio and video data media streams between client and server devices on opposite sides of a reverse proxy. As it is well known in the art, generally reverse proxies only permit HTTP traffic to flow through. Consequently, some have utilized HTTP tunneling to push non-HTTP data through a reverse proxy while complying with the HTTP requirement of the reverse proxy. In further illustration, FIG. 1 is a schematic illustration of a system incorporating an HTTP tunnel through a reverse proxy. Specifically, as shown in FIG. 1, a reverse proxy 130 can be disposed between a client computing device 110 and a server computing device 120 communicatively coupled to one another over the data communications network 140. The reverse proxy 130 can include an address mapping table 150 for associating incoming requests to specific back-end server computing devices protected by the reverse proxy 130.

An HTTP tunnel 180 can be established first by initiating a connection commonly used for secured sockets layer (SSL) connection with the reverse proxy 130. Specifically, the client computing device 110 can forward an HTTP-CONNECT message 170 to the reverse proxy 130 responsive to which the reverse proxy 130 can accept the connection from the client computing device 110. The open connection can be referred to as an HTTP tunnel 180 in as much as HTTP traffic 190 encapsulating non-HTTP data can be routed via the reverse proxy 130 through the tunnel 180 to the server computing device 120.

Once the tunnel has been established, the reverse proxy 130 will ignore the HTTP traffic 190, even though the HTTP traffic 190 contains non-HTTP data because in accordance with the SSL session, the HTTP traffic 190 will be encrypted and unrecognizable to the reverse proxy 130. Still, while HTTP tunneling can be beneficial for many applications, HTTP as a protocol suffers from substantial latency issues. Time sensitive applications such as real-time media processing, however, cannot tolerate the latencies associated with HTTP. Thus, HTTP tunneling real-time media streams such as audio and video through a reverse proxy simply is not an option in most cases.

SUMMARY OF THE INVENTION

The present invention addresses the deficiencies of the art in respect to HTTP tunneling and provides a novel and non-obvious method, system and apparatus for tunneling non-HTTP data streams through a reverse proxy. In a preferred aspect of the present invention, a method for tunneling non-HTTP data streams through a reverse proxy can include soliciting a connection with a reverse-proxy protecting a back-end server computing device and establishing a connection with the back-end server computing device via the reverse proxy. Responsive to establishing the connection, the connection can be maintained in order to exchange non-HTTP data over the connection. Significantly, and unlike prior art HTTP tunneling implementations, in the present invention, the non-HTTP data can be exchanged over the secured connection without encapsulating the non-HTTP data within HTTP messages.

More particularly, the soliciting step can include requesting a secured sockets layer (SSL) connection with the reverse proxy. Subsequently, the SSL connection can be completed with the reverse proxy through a handshaking process. The requesting step itself can include acquiring an address for the reverse proxy and a port for establishing an SSL connection with the reverse proxy. Additionally, an address for the back-end server computing device and a port for establishing an SSL connection with the back-end server computing device can be acquired. Once the addresses and ports have been acquired, an HTTP-CONNECT message can be formulated using the acquired addresses and ports. Finally, the formulated HTTP-CONNECT message can be written to the reverse proxy.

The method of the invention can have particular application to the exchange of real-time streaming media which cannot be passed through the reverse proxy in an HTTP tunnel. In this regard, the exchanging step can include formatting a buffer with real-time data and writing the buffer to the connection. Additionally, to ensure only authorized access to the server computing device, the method can further include the step of performing authentication in the reverse proxy as a condition of establishing the secured connection.

In a system for tunneling non-HTTP data streams through a reverse proxy, a reverse proxy can be disposed between a client computing device and a server computing device in a computer communications network. An authentication process can be configured for operation in conjunction with the reverse proxy. Moreover, a communications socket such as an SSL link can be established between the reverse proxy and the client computing device. Finally, a non-HTTP data handler can be coupled to the communications socket and programmed to write non-HTTP data to the reverse proxy without encapsulating the non-HTTP data within HTTP messages. In a preferred aspect of the invention, the server computing device can be a real-time streaming media server, the non-HTTP data handler can be a real-time streaming media client; and the non-HTTP data can be real-time streaming media.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for tunneling non-HTTP streams through a reverse proxy. In accordance with the present invention, a socket connection can be established with a reverse proxy. Based upon the establishment of the socket connection, the socket can be passed to a non-HTTP data stream handler. The non-HTTP data stream handler can maintain the open socket connection and can write non-HTTP data streams over the socket without encapsulating the non-HTTP data within an HTTP message. The non-HTTP data stream handler can continue to exchange the non-HTTP data over the open socket until finished. Subsequently, the non-HTTP data stream handler can close the socket.

Figure 1:
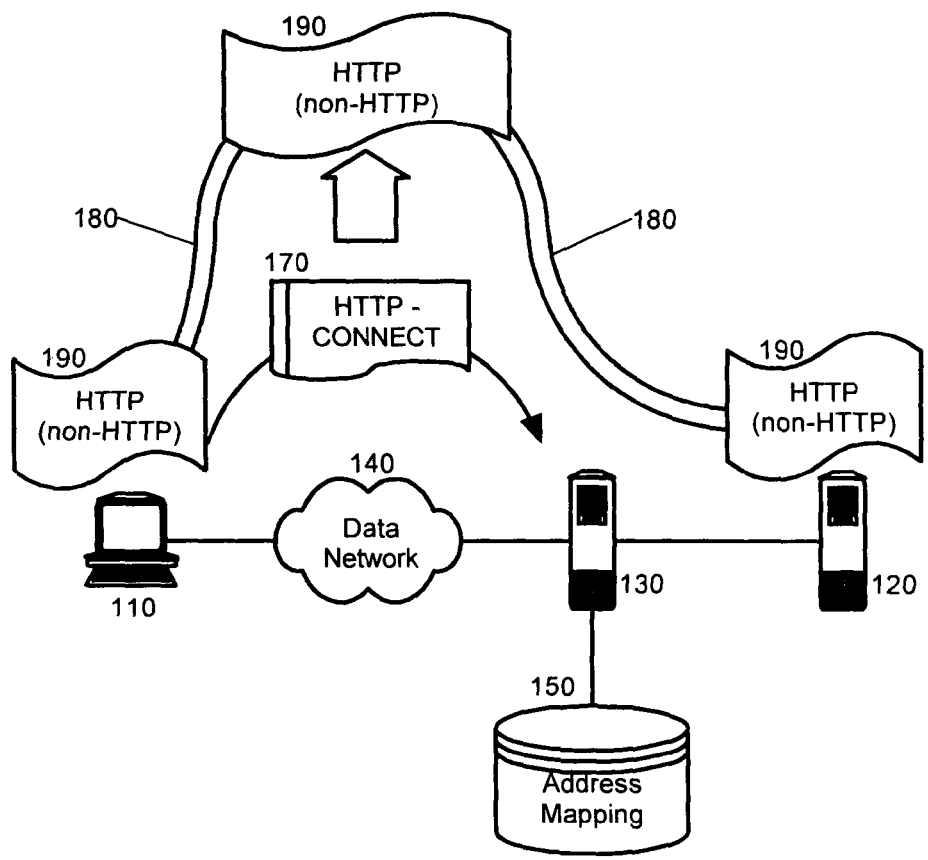
FIG. 1 is schematic illustration of a reverse proxy disposed within a client-server system configured for HTTP tunneling in accordance with the known art.
Figure 2:
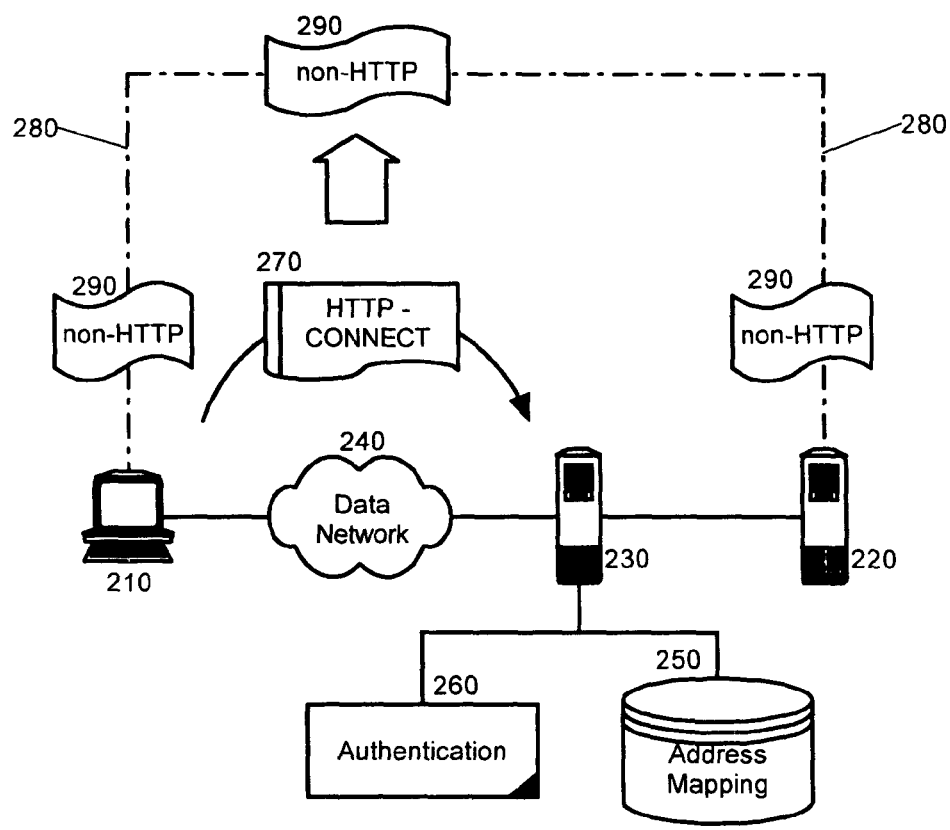
FIG. 2 is schematic illustration of a reverse proxy disposed within a client-server system configured for non-HTTP tunneling in accordance with the present invention; and, FIG. 3 is a flow chart illustrating a process for establishing a non-HTTP tunnel through a reverse proxy in the system of FIG. 2.

To further illustrate, FIG. 2 is schematic illustration of a reverse proxy disposed within a client-server system configured for non-HTTP tunneling in accordance with a preferred aspect of the present invention. As shown in FIG. 2, a reverse proxy 230 can be disposed between a client computing device 210 and a server computing device 220. The client computing device 210 can be communicatively linked to the reverse proxy 230 over the data communications network 240. In the preferred aspect of the invention, albeit a non-exclusive aspect of the invention, the server computing device 220 can be a media server associated with a Web conferencing engine and the client computing device 210 can be a media client configured to interact with the Web conferencing engine.

The reverse proxy 230 can include both an address mapping table 250, and an authentication process 260. The address mapping table 250 can include proxy rules for routing incoming requests to appropriate back-end servers protected by the reverse proxy 230. In this regard, the address mapping table 250 can include proxy rules for routing requests intended for the server computing device 220 to the server computing device 220. The authentication process 260, by comparison, can include logic for authenticating the client computing device 210 and for applying access restrictions to the server computing device 220 based upon the identity of the client computing device 210.

Importantly, a communications socket 280 can be established between the client computing device 210 and the reverse proxy 230. In particular, the communications socket 280 can be created by way of an HTTP-CONNECT request issued by the client computing device 210 to the reverse proxy 230. In response to the HTTP-CONNECT message, the reverse proxy 230 can authenticate the client computing device 210 and a socket 280 can be established between the client computing device 210 and the reverse proxy 230. Notably, unlike prior art tunneling methodologies known in the art, in the present invention, the socket 280 can be used nakedly in the absence of HTTP messages to exchange non-HTTP data streams 290 between the client computing device 210 and the server computing device 220 through the reverse proxy 230.

Figure 3:
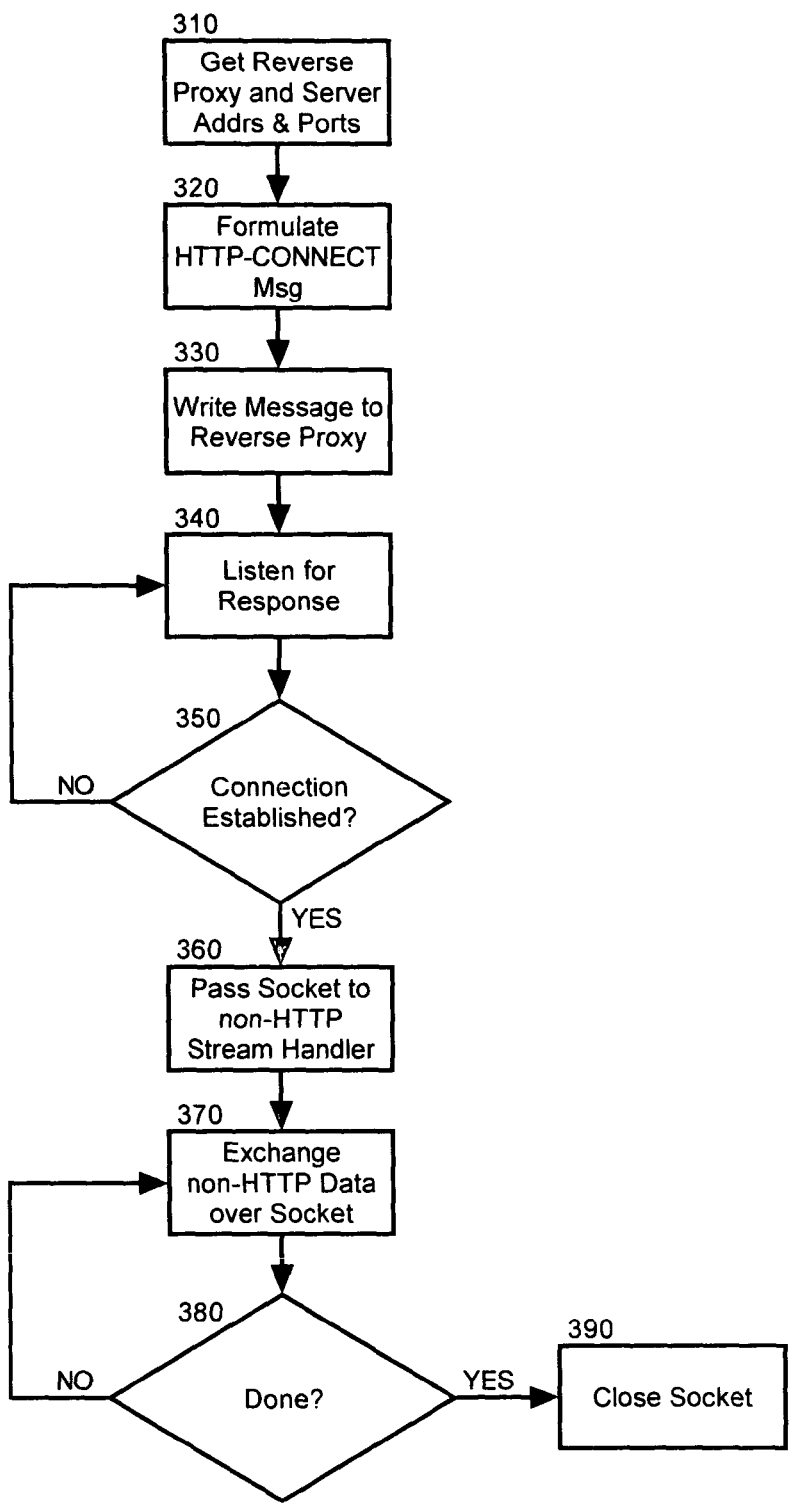

To better illustrate the operation of the system of the invention, FIG. 3 is a flow chart illustrating a client process for establishing a non-HTTP tunnel through a reverse proxy in the system of FIG. 2. Beginning in block 310, the address of the reverse proxy can be acquired as can the port of the reverse proxy through which a secured connection such as an SSL connection can be established. Moreover, the address of the back-end server can be acquired as can the port of the back-end server through which a secured connection such as an SSL connection can be established. In both cases, generally, port 443 can be used to establish an SSL connection as it is known in the art. In any case, in block 320 a message can be constructed for requesting a secure connection, for instance an HTTP-CONNECT message. Subsequently, in block 330 the message can be written to the reverse proxy at the acquired address and port.

In block 340, the client process can "listen" for a response to the HTTP-CONNECT message. If in decision block 350 the reverse proxy responds so as to complete a handshaking processes necessary to establish a connection such as an SSL connection, in block 360 a handle to the established connection can be passed to a non-HTTP stream handler such as a real-time streaming media transmission process. In block 370, the non-HTTP stream handler can exchange non-HTTP data with the server through the reverse proxy over the connection without first encapsulating the non-HTTP data in HTTP messages. In this regard, as it is known in the art, once a connection has been established, a reverse proxy will not automatically close the connection, but will maintain the connection and will ignore data flowing through the connection.

Consequently, the exchange process can continue without interference by the reverse proxy through decision block 380 until complete. Once complete, in block 390 the connection can be closed and the process can terminate. The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for tunneling non-hypertext transfer protocol (HTTP) data streams through a reverse proxy, the method comprising the steps of:
    soliciting a secured connection with a reverse proxy protecting a back-end server computing device;
    establishing a connection with said back-end server computing device via said reverse proxy through said solicitation; and,
    responsive to establishing said connection, maintaining said connection by a non-HTTP stream handler comprising a real-time streaming media transmission process, and exchanging non-HTTP data over said secured connection using said non-HTTP stream handler without encapsulating said non-HTTP data within HTTP messages.

2. The method of claim 1, wherein said soliciting step comprises the step of requesting a secured sockets layer (SSL) connection with said reverse proxy.

3. The method of claim 2, wherein said requesting step comprises the steps of:
    acquiring an address for said reverse proxy and a port for establishing an SSL connection with said reverse proxy;
    further acquiring an address for said back-end server computing device and a port for establishing an SSL connection with said back-end server computing device;
    formulating an HTTP-CONNECT message using said acquired addresses and ports; and,
    writing said formulated HTTP-CONNECT message to said reverse proxy.

4. The method of claim 1, wherein said exchanging step comprises the steps of:
    formatting a buffer with real-time data; and,
    writing said buffer to said secured connection.

5. The method of claim 1, further comprising the step of performing authentication in said reverse proxy as a condition of establishing said secured connection.

6. A system for tunneling non-hypertext transfer protocol (HTTP) data streams through a reverse proxy, the system comprising:
    a reverse proxy disposed between a client computing device and a server computing device in a computer communications network;
    an authentication process configured for operation in conjunction with said reverse proxy;
    a communications socket established between said reverse proxy and said client computing device; and,
    a non-HTTP data handler comprising a real-time streaming media transmission process coupled to said secured communications socket and programmed to write non-HTTP data to said reverse proxy without encapsulating said non-HTTP data within HTTP messages.

7. The system of claim 6, wherein server computing device is a real-time streaming media server, said non-HTTP data handler is a real-time streaming media client, and said non-HTTP data is real-time streaming media.

8. The system of claim 6, wherein said communications socket is a secured sockets layer (SSL) communications link.

9. A machine readable storage device having stored thereon a computer program for tunneling non-hypertext transfer protocol (HTTP) data streams through a reverse proxy, the computer program comprising a routine set of instructions for causing the machine to perform the steps of:
    soliciting a secured connection with a reverse proxy protecting a back-end server computing device;
    establishing a connection with said back-end server computing device via said reverse proxy through said solicitation; and,
    responsive to establishing said connection, maintaining said connection by a non-HTTP stream handler comprising a real-time streaming media transmission process, and exchanging non-HTTP data over said secured connection using said non-HTTP stream handler without encapsulating said non-HTTP data within HTTP messages.

10. The machine readable storage device of claim 9, wherein said soliciting step comprises the step of requesting a secured sockets layer (SSL) connection with said reverse proxy.

11. The machine readable storage device of claim 10, wherein said requesting step comprises the steps of:
    acquiring an address for said reverse proxy and a port for establishing an SSL connection with said reverse proxy;
    further acquiring an address for said back-end server computing device and a port for establishing an SSL connection with said back-end server computing device;
    formulating an HTTP-CONNECT message using said acquired address and port; and,
    writing said formulated HTTP-CONNECT message to said reverse proxy.

12. The machine readable storage device of claim 9, wherein said exchanging step comprises the steps of:
    formatting a buffer with real-time data; and,
    writing said buffer to said secured connection.

13. The machine readable storage device of claim 9, further comprising the step of performing authentication in said reverse proxy as a condition of establishing said secured connection.

* * * * *